Aug. 4, 1936.  W. N. SWANSON  2,049,595
RAKE
Filed Nov. 29, 1935
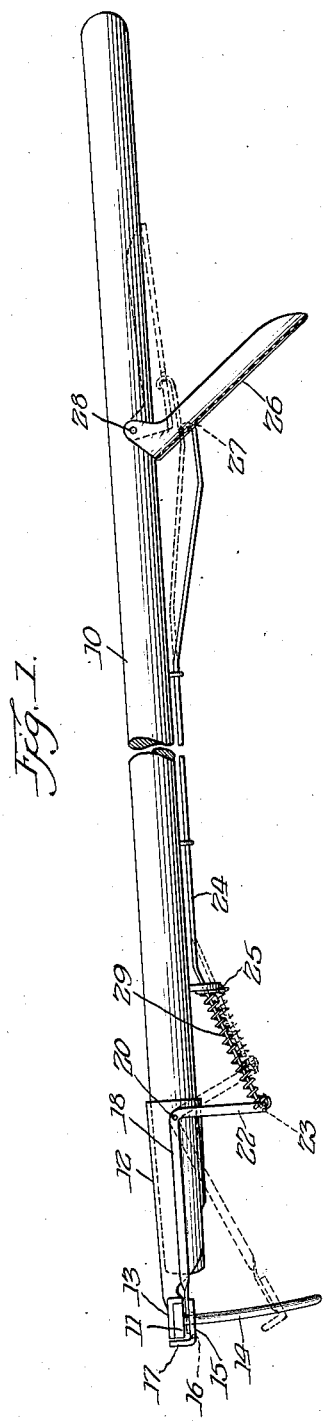
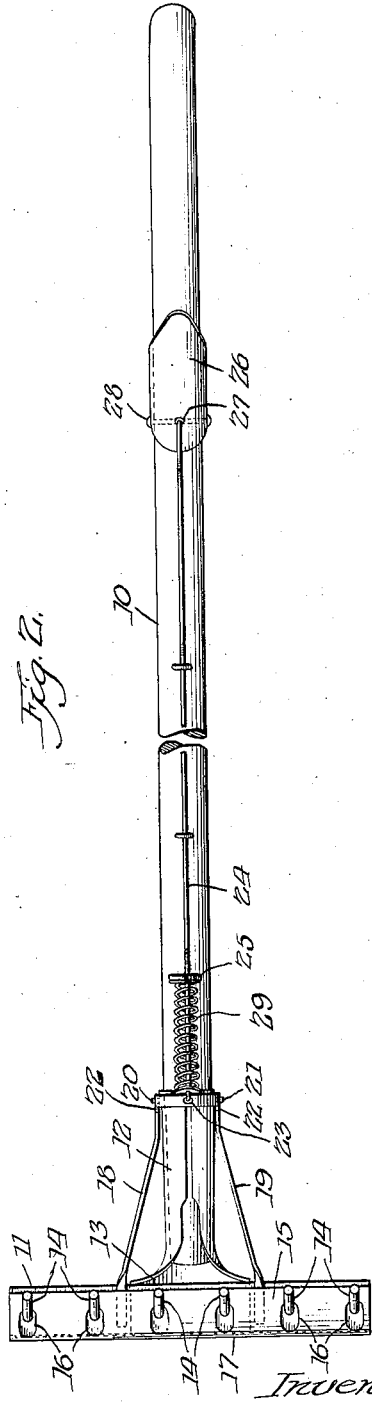
Inventor:
William N. Swanson
By James R. McKnight.
Attorney Patented Aug. 4, 1936

2,049,595

UNITED STATES PATENT OFFICE 2,049,595

RAKE

William N. Swanson, Chicago, Ill.

Application November 29, 1935, Serial No. 51,978

1 Claim. (Cl. 55—146)

My invention relates to a self cleaning rake.

Among the objects of my invention are to create a rake having means easily operable by the user to remove the leaves or other gathered matter from the prongs of the rake; to supply such a means operable by the hand of the user on the handle so that the hands of the user need not be soiled or injured by touching the rake head, tines or gathered matter; to provide such a means so constructed that after it is used it will not interfere with the normal operation of the rake, and which will automatically return to a non-interfering position as soon as it has completed its function, and such other objects, advantages and capabilities as will later more fully appear and which are inherently possesed by my invention.

While I have shown in the accompanying drawing a preferred embodiment of my invention, yet I wish it understood that the same is susceptible of modification and change without departing from the spirit of my invention.

Referring more particularly to the drawing:

Fig. 1 is a side elevational view of my invention showing the removing means in one position in solid lines and in another position in dotted lines; and Fig. 2 is a bottom plan view.

Referring more particularly to the embodiment selected to illustrate my invention, it comprises an elongated handle 10, a bar or rake head 11 positioned substantially at a right angle to said handle, a collar 12 substantially surrounding a portion of the bottom end of said handle 10, and having a substantially flat forward extension 13 adapted to be soldered or otherwise permanently attached to the top of said bar 11 at substantially its center. From said bar 11 project downwardly a plurality of prongs or tines 14. A plate 15 having a plurality of openings 16 through which pass the prongs 14 is normally positioned beneath the bottom of the bar 11, and has a flange 17 bent substantially at a right angle to the plate itself and normally lying against the front edge of said bar 11. A pair of arms 18 and 19 have their forward ends permanently attached by solder, welding or the like to either side of the plate 15, said arms converging backwardly and inwardly until they touch the outside of the collar 12 adjacent the collar's upper end, where the arms are pivotally held to said collar and the handle 10 within said collar by pins 20 and 21 respectively. The arms 18 and 19 then turn downwardly at substantially a right angle and join to form a yoke 22. Passing through an opening 23 in the bottom portion of said yoke 22, a rod 24 is bent back on itself and thus fastens the rod to said yoke. The rod continues through an eyelet 25 fixed in the handle 10 and along the handle 10 to lever handle 26 through an opening 27 through which it passes and is bent back on itself to be held within said lever handle 26. The lever handle 26 is pivotally held by pins 28 to the elongated handle 10.

In use my rake functions as any other rake during the raking operation. When the prongs of the rake are full or partly full of leaves, or other gathered matter, it was necessary heretofore for the user to bend down and remove with his hands this gathered matter, thus exposing his hands to soiling and injury. With my device the user simply presses inwardly on the lever handle 26 which pulls the rod 24 upwardly. The rod 24 in turn moves the yoke 22 so that the arms 18 and 19 press downwardly on the plate 15. The plate 15 moves downwardly on the prongs 14 and casts off the gathered matter.

In that portion of the rod 24 between the yoke 22 and eyelet 25 I place a coiled spring 29 which, as soon as pressure is released on the lever handle 26, returns the rod 24 to normal position and thus returns the plate 15 to its normal non-interfering position at the bottom of the bar 11, until pressure is again applied to the lever handle 26.

Having thus described my invention,

I claim:

A device of the class described comprising an elongated handle, a rake head positioned transversely to said handle, said rake head having a plurality of prongs, a plate normally positioned under said rake head, said plate having a plurality of openings positioned substantially opposite said prongs, said plate having an integral flange bent substantially at a right angle to said plate and adapted to normally lie against the front edge of said rake head, a collar substantially surrounding the bottom portion of said handle, and having a substantially flat forward extension attached to the top of said rake head, said collar also having a rearward extension to receive the lower end of said handle, a pair of arms attached to either side of said plate at their lower ends and continuing upwardly and inwardly to touch either side of the rearward extension of said collar, means for pivotally holding said arms to the rearward extension of said collar and said handle, said arms continuing and bending at right angles to form a yoke, a rod connected to said yoke and continuing along said handle, a lever connected to said rod at its upper end and adapted upon pressure to move said rod, and in turn to actuate said yoke to lower said arms and press said plate downwardly on said prongs to remove gathered matter caught in and between said prongs, said rod passing through an eyelet fixed in said handle adjacent its lower end, a resilient member positioned on said rod between said yoke and said eyelet so that upon pressure being released on said lever, said resilient member will force said rod upwardly and carry in turn said yoke and said arms to return said plate to normal position.

WILLIAM N. SWANSON.